United States Patent [19]

Lohmüller et al.

[11] Patent Number: 4,989,681

[45] Date of Patent: Feb. 5, 1991

[54] DRILL BIT FOR PRODUCING UNDERCUTS

[75] Inventors: Johann Lohmüller, Ravensburg; Klaus Dreps, Altshausen, both of Fed. Rep. of Germany

[73] Assignee: DreBo Werkzeugfabrik GmbH, Altshausen, Fed. Rep. of Germany

[21] Appl. No.: 364,646

[22] Filed: Jun. 9, 1989

[30] Foreign Application Priority Data

Jun. 10, 1988 [DE] Fed. Rep. of Germany ....... 3819833

[51] Int. Cl.$^5$ ............................................. E21B 10/00
[52] U.S. Cl. .................................. 175/398; 175/399; 175/406; 175/408
[58] Field of Search ................ 175/79, 82, 220, 263, 175/385, 393, 398, 399, 406, 408, 410, 418; 299/79, 81

[56] References Cited

U.S. PATENT DOCUMENTS

| 2,773,672 | 12/1956 | Holmes et al. | 175/399 |
| 3,163,243 | 12/1964 | Cleary | 175/399 |
| 3,199,616 | 8/1965 | Hjalsten | 175/398 |
| 4,111,270 | 9/1978 | Fischer et al. | 175/408 |
| 4,372,401 | 2/1983 | Fischer | 175/408 |
| 4,492,278 | 1/1985 | Leighton | 175/418 |
| 4,620,600 | 11/1986 | Persson | 175/398 |
| 4,635,738 | 1/1987 | Schillinger et al. | 175/398 |
| 4,768,599 | 9/1988 | Eischeid | 175/399 |

FOREIGN PATENT DOCUMENTS

918741 8/1954 Fed. Rep. of Germany ...... 175/398

Primary Examiner—Bruce M. Kisliuk
Attorney, Agent, or Firm—Robert W. Becker & Associates

[57] ABSTRACT

A drill bit for producing an undercut. The drill bit includes a shaft and a cutting edge that is disposed asymmetrically radially beyond the shaft in a front end portion of the drill bit. A planar guide surface is provided on a conical end face of the drill bit. This guide surface is disposed radially opposite the cutting edge. The guide surface terminates at a concentric tip of the drill bit.

9 Claims, 5 Drawing Sheets

DRILL BIT FOR PRODUCING UNDERCUTS

BACKGROUND OF THE INVENTION

1. Field of the Invention

The present invention relates to a pin drift or dowel drill bit for producing an undercut, with the drill bit including a shaft and a cutting edge that is disposed asymmetrically radially beyond the shaft in a front end portion of the drill bit.

2. Description of the Prior Art

A drill bit of this general type is known from German Gebrauchsmuster 77 38 522 Millich published May 24, 19878. This known drill bit has a blunt point and a radially projecting nose that are supposed to provide for the production of an undercut.

However, in practice this type of drill bit has not proven satisfactory because the drill bit runs rather unsteadily. If an undercut is to be produced in material that contains pockets which have varying degrees of hardness, the use of this known drill bit is possible to only a limited extent, because it is easily deflected, resulting in a wobbling movement, and therefore produces an unsymmetrical undercut.

Furthermore, with the heretofore known drill bit it is not easy to recognize when the undercut has been completed. As a result, either the tool is used too long, or the undercut is not made large enough, so that an unsatisfactory holding force for an introduced dowel results.

It is also known to provide guide means in the region of the inlet of the blind hole for the purpose of guiding the drill bit during production of the undercut However, this process can be utilized with only relatively short drill bits. Furthermore, this process cannot be used if the undercut must be produced at a granite pocket. In addition, the wobbling movement of the tip of the drill bit makes for an inexact undercut. Unfortunately, this is in direct contrast to the requirement for producing an as exact and reproducible undercut as possible for bore holes, so that the safety reserves that theoretically result from the undercut can be fully utilized.

It is therefore an object of the present invention to provide a drill bit of the aforementioned general type that operates reliably even where the material in which a blind hole undercut is to be produced has different hardnesses, and also where the blind holes are very deep, and with which at the same time it is possible to establish or determine when production of the undercut is completed.

BRIEF DESCRIPTION OF THE DRAWINGS

This object, and other objects and advantages of the present invention, will appear more clearly from the following specification in conjunction with the accompanying schematic drawings, in which:

FIG. 8a is a cross-sectional view from above and from the side of the extension of FIG. 18;

SUMMARY OF THE INVENTION

The drill bit of the present invention is characterized primarily in that it has a conical end face that is disposed remote from the drill bit shaft and on which is provided a planar guide surface, with this guide surface being disposed radially opposite the cutting edge, and with the drill bit having a concentric tip at which the guide surface terminates.

As a consequence of the inventively provided conical guide surface, a full-surface support is available relative to the radially outwardly acting force of the cutting edge for producing the undercut. Furthermore, this construction brings about a sliding automatic centering action, because the conical guide surface corresponds to the end face or base of the previously produced blind hole, so that the guide surface can slide along this base and automatically moves toward the tip of the blind hole when a slight axial pressure is applied to the inventive drill bit.

As a result of the conical drill bit tip, which is concentric to the axis of rotation thereof, a helical movement of the guide surface is possible; starting from an initially eccentric position of the drill bit tip relative to the tip of the blind hole, during production of the undercut the guide surface moves in a defined sliding manner toward the axis of the blind hole. When the tip of the drill bit coincides with the blind hole axis, the production of the undercut is completed. The guide surface, which then fully rests against the cooperating cone of the tip of the blind hole, then prevents further drilling, so that it is easy to determine when production of the undercut is completed. In addition is the fact that at this moment the drill bit rotates concentrically about its shaft axis for the first time, whereas previously, depending upon the specific embodiment, a wobbling movement was carried out. In addition, the reduction in vibration resulting herefrom can be manually recognized, which results in an additional indication of completion of an undercut.

Concentric-symmetrical undercuts can also be produced in rock or concrete having pockets of materials of different hardnesses. In this connection, it is advantageous to operate with relatively slight axial pressure and to utilize the self-centering capability of the inventive drill bit. Even very deep undercuts ca be produced without unfavorable leverages occurring. Another advantage of the present invention is that no auxiliary means, such as ball bearings, springs, or articulations, have to be used for producing the undercut. Furthermore, a wide variety of cutting edge configurations can be used in order to conform the shape of the undercut, which results from the profile of the cutting edge, to respective requirements. Accordingly, the undercut can have radially extending support surfaces or more or less conical support surfaces.

Pursuant to one advantageous specific embodiment of the present invention, a further cutting edge is asymmetrically disposed radially beyond the drill bit shaft, with this further cutting edge being spaced from and radially opposite the first cutting edge. This embodiment is particularly advantageous for being able to produce especially deep undercuts, in which connection the undercuts can be precisely positioned.

With two undercuts it is particularly advantageous that an appropriate dowel can produce a connection at two oppositely disposed surfaces of the undercuts, so that it is possible to have a reliable securement, for example in concrete, in every direction.

Particularly favorable in this connection is the establishment of merely a few undercut bore holes if, for example, ceilings are to be hung. Whereas up to now rows of blind holes that had no undercuts were frequently equipped with appropriate dowels for economical reasons, and the ceiling suspension means were secured in these dowels, in recent times stricter safety concerns have come into being, since rows of bore holes in the tensile region of the concrete act as perforations This can be avoided pursuant to the present invention since the inventive drill bit makes it economical to produce undercuts in blind holes.

Furthermore, the production of the tool is also very advantageous. It is merely necessary to provide a rod or round steel with the desired cone in conformity with the conical guide surface, and to provide a lateral groove in the front end portion. A small hard metal plate that forms the cutting edge can then be soldered in the groove.

Pursuant to a further advantageous specific embodiment of the present invention, the drill bit shaft is tapered somewhat toward the back in order to facilitate introduction of the inventive drill bit still further. In addition, a machine adapter embodied in conformity with the desired requirements can also be provided in the connection region of the drill bit.

Pursuant to one advantageous specific embodiment of the present invention, the connection region is provided with a square end or key in which is secured a coupling having a universal joint. In this way, inventively undercut bore holes having a very slight taper can be produced because due to the only slight axial force that has to be applied, and the self-centering characteristic of the inventive drill bit, the drilling machine can also be guided in an angular position.

Advantageous for this embodiment is the construction of the inventive drill bit with two spaced-apart cutting edges, because the essentially axial forces from the advancement of the two spaced-apart cutting edges then nearly compensate one another due to the opposite arrangement of the cutting edges, so that even during the production of undercuts no overly great vibrations can be observed in the drilling machine. With this embodiment, the completion of the undercuts can therefore be recognized by the increase in the speed of the drill bit.

Pursuant to one preferred embodiment, the depth of an undercut corresponds approximately to half of the radial distance of the cutting edges from the front end portion in an outward direction.

Pursuant to a further advantageous specific embodiment of the present invention, it is proposed to provide an indicator sleeve, which is biased by a compression spring in a direction toward the tip of the drill bit, with a stamp or an adhesive marking ring. As long as the undercut has not yet been completely produced, the axis of the drill bit is inclined relative to the axis of the blind hole. This prevents the indicator sleeve, which is spring-loaded in this direction, from entering the entrance of the blind hole. Rather, an external cone on the indicator sleeve still rests at a slight angle against the entrance to the blind hole, with an edge that is disposed between the external cone and the adjoining sliding cylinder preventing entry into the blind hole.

In this connection, the external cone simultaneously acts as a stabilizing element and counteracts a wobbling movement.

As soon as the undercut is completed, whereupon the angular positioning of the drill bit axis relative to the blind hole axis is eliminated the means that was blocking entry of the indicator sleeve, namely the edge between the external cone and the sliding cylinder in conjunction with the entrance to the blind hole, is eliminated, and the indicator sleeve can slide in an abrupt manner via its sliding cylinder into the entrance of the blind hole. In this connection, the sliding cylinder has a diameter that is only slightly less than the diameter of the blind hole.

Where the indicator sleeve is provided with an adhesive marking ring, this ring is placed upon the indicator sleeve in such a way that that surface of the ring that is provided with the adhesive faces away from the indicator sleeve.

An abutment surface adjoining the rear of the sliding cylinder can be embodied as a stamp and strikes a stamp impression into the wall or ceiling surface that surrounds the blind hole, or sticks the marking ring thereto. This impression makes it possible to recognize a blind hole that has been provided with an undercut as such, whereas it is otherwise difficult to subsequently economically determine which blind holes have been provided with undercuts.

Pursuant to a further advantageous specific embodiment, the inventive drill bit can be provided with means to suction off or remove drillings. For this purpose, one or more suction openings are provided in the region of the tip of the drill bit. Each suction opening is angled toward the outside and is in flow communication with a suction line that extends through the drill bit shaft. Via a connector and a sealing member, a suction outlet is provided that is rotatably mounted relative to the drill bit shaft. For this purpose, the suction line is in flow communication with a transverse bore that extends substantially perpendicular to the drill bit shaft and that is surrounded by a suction chamber in the sealing member. With this suction device, which can be connected to a known suction unit, drillings that result during production of the undercut can be withdrawn directly where they are produced. If the suction mechanism is used together with the indicator sleeve, it is advantageous to assure entry of suction air into the blind hole from the outside via an appropriate channel or slot.

This serves at the same time to simplify assembly, because the hard metal plate can then be guided through the slot.

It is furthermore possible to provide an ancillary extension as an accessory for the inventive drill bit. With such exchangeable extensions, it is possible utilizing the inventive features to provide one or more undercuts that are spaced from the base of the blind hole. An internal cone provided on that end of the extension that faces the drill bit is placed upon the tip of the drill bit and the extension is turned in such a way that a retaining arm catches behind the projection that carries the cutting edge, so that the extension is arrested in the axial direction. This protection against twisting is achieved by an abutment surface (engagement means) on a support arm that also carries the retaining arm. This abutment surface rests at the side against the projection of the drill bit, so that during rotation the cutting edge takes the extension along with it.

On the opposite side, the extension is open, so that it can be easily mounted. Accordingly, the body of the extension is unsymmetrical relative to the axis of the drill bit, and is provided with an eccentric body axis. Coaxial to the axis of the internal cone (in conformity with the drill bit axis) is an external cone at the other end of the body of the extension. When this extension is being used, the external cone forms the planar guide surface.

Further specific features of the present invention will be described in detail subsequently.

DESCRIPTION OF PREFERRED EMBODIMENTS

Figure 1:
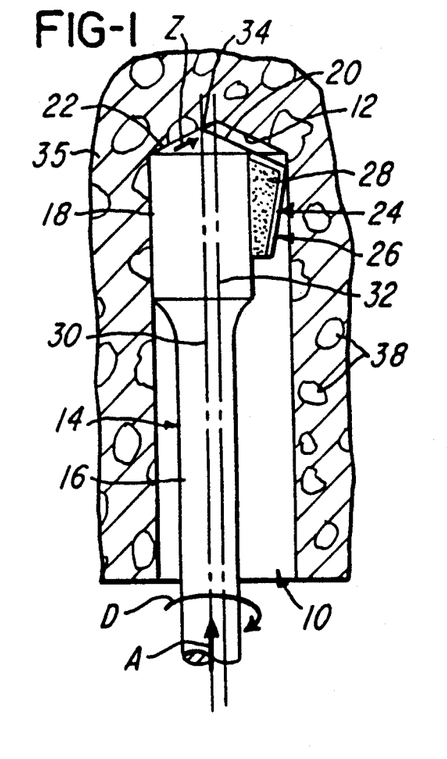
FIG. 1 is a side view of the front portion of one exemplary embodiment of the inventive drill bit prior to production of the undercut.

Referring now to the drawings in detail, FIG. 1 illustrates a blind hole 10 that was produced by a conventional drill bit. Due to the design of the cutting edge of the drill bit, the base of the blind hole has a conical shape 12 that corresponds to the configuration of the tip or point of the drill bit, which can vary depending upon the material involved. For example, if the material is concrete, the blind hole has a base with a conical shape 12 having an opening angle of approximately 130°.

After the blind hole 10 has been produced, the inventive drill bit 14 is introduced therein. The drill bit 14 has a shaft 16, which is adjoined by a front end region 18 that in the illustrated embodiment has a diameter that is larger than the diameter of the shaft 16.

The front end portion 18 has an end face 20 that is provided with a conical guide surface 22.

Formed on the side of the front end region 18 radially beyond &he shaft 16 is a projection 24 that is provided with a cutting edge 26, which is disposed radially opposite the guide surface 22. For this purpose, the projection 24, along with the cutting edge 26, is comprised of a carbide tip or small hard metal plate 28 that is soldered into a groove or slot in the front end portion 18 of the inventive drill bit 14. In this way, the hard metal plate 28 at the same time protects the guide surface 22 from wear. The conical angle of the end face 20 corresponds to the conical angle of the conical shape 12 of the blind hole 10. During rotation of the inventive drill bit 14 in the direction of the arrow D, the guide surface 22 slides along in the conical base 12 of the blind hole 10, whereby the pressure on this conical base 12 is quite low due to the planar configuration of the guide surface 22, even when the axial force that is applied in the direction of the arrow A is relatively great. Due to the force parallelogram, when a force is exerted or applied in the direction of the arrow A, there exists at the guide surface 22, in addition to the force component that is perpendicular to the conical end 12 of the blind hole, a force component in the direction of the arrow Z for centering an axis of rotation 30 of the drill bit 14 concentric to an axis 32 of the blind hole 10.

Figure 2:
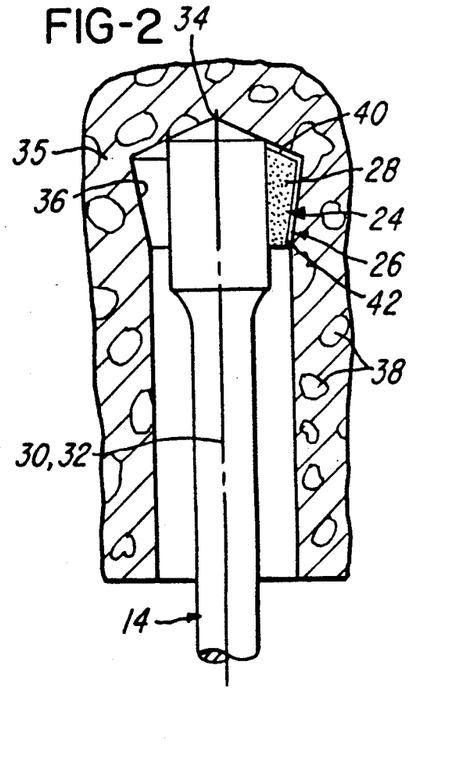
FIG. 2 is a view similar to FIG. 1 but after completion of the undercut.

When the undercutting is completed, as illustrated in FIG. 2, the tip or point 34 of the drill bit is concentrically disposed in the conical base 12 of the blind hole 10, while the cutting edge 26 has dug into the concrete 35 where it has generated a similarly concentric-symmetrical undercut 36.

When viewed in the radial direction, the guide surface 22 extends from the tip 34 of the drill bit to the outer periphery of the front end portion 18 of the drill bit 14, so that in this region of the conical base 12 of the blind hole 10, no material is removed or compacted during production of the undercut 36 due to the low surface pressure.

The concrete 35 is provided with pockets 38 that have a different resistance. Nevertheless, the production of the undercut 36 is effected entirely symmetrically without the cutting edge 26 being able to be deflected by the pockets 38. This too is based upon the special configuration of the guide surface 22.

In the embodiment illustrated in FIGS. 1 and 2, the shaft 16 has a diameter that is less than that of the front end portion 18. This serves not only to facilitate introduction into the blind hole, but also serves to reduce the mass that has to be rotated.

The cutting edge 26 has a front cutting edge portion 40 and a side cutting edge portion 42. Particularly favorable for producing an undercut at relatively low load of the cutting edge per unit of length is the embodiment of the front and side cutting edge portions 40 and 42 illustrated in FIGS. 1 and 2, whereby furthermore the advantage results that the undercut at the end face is disposed in the extension of the conical base of the blind hole and has the same conical angle.

However, if desired other cutting edge configurations can also be provided: examples of other configurations are illustrated in FIGS. 3 to 6. Thus, the configuration of the cutting edge can readily be adapted to the appropriate need, whereby it is merely necessary to use an appropriate small hard metal plate 28.

Furthermore, standard small hard metal plates 28 can advantageously be utilized for the inventive drill bit 14, so that the manufacturing costs can be kept very low.

Figures 3, 4:
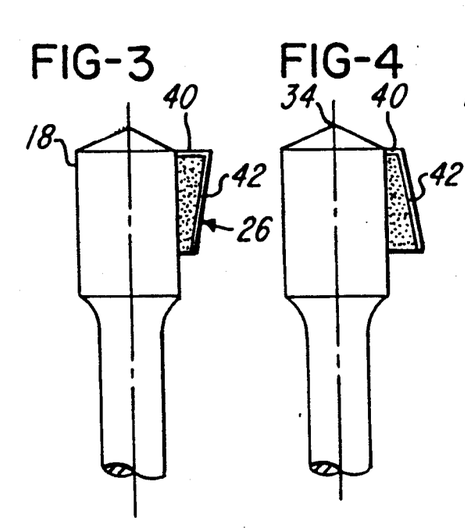
FIG. 3 is a view that shows the front portion of one exemplary embodiment of an inventive drill bit utilizing a special construction of the cutting edge.
FIG. 4 is a view of the front portion of an exemplary embodiment of an inventive drill bit utilizing a different special construction of the cutting edge.

In the embodiment of the small hard metal plate 28 illustrated in FIG. 3, the side cutting edge portion 42 extends at an angle to the tip 34 of the drill bit, whereby it essentially corresponds to the side cutting edge portion 42 of the embodiment of FIGS. 1 and 2; the front cutting edge portion 40 extends radially.

To produce a different undercut shape, pursuant to the embodiment illustrated in FIG. 4 it is merely necessary to turn the small hard metal plate 28 by 180°, so that the side cutting edge portion 42 extends at an angle toward the tip of the drill bit.

Figure 5:
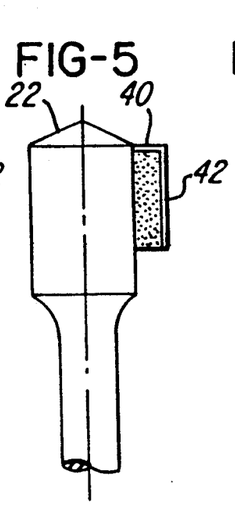
FIG. 5 is a view of the front portion of an exemplary embodiment of an inventive drill bit utilizing yet another special construction of the cutting edge.

The use of a rectangular hard metal plate as in FIG. 5 results in a concentric side cutting edge portion 42 and a radial front cutting edge portion 40.

Figure 6:
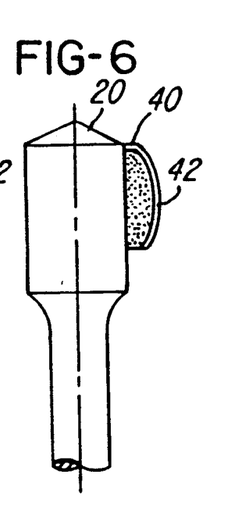
FIG. 6 is a view of the front portion of an exemplary embodiment of an inventive drill bit utilizing another special construction of the cutting edge.

In the embodiment illustrated in FIG. 6, the side cutting edge portion 42 has a rounded configuration. This can be advantageous in certain applications where the dowel or pin is provided with a correspondingly shaped bulge.

In conformity with the shape of the side cutting edge portion 42, the finished undercut 36 is provided with a bearing surface 44 (see FIGS. 8 and 10) upon which a dowel can then be supported.

Figure 7:
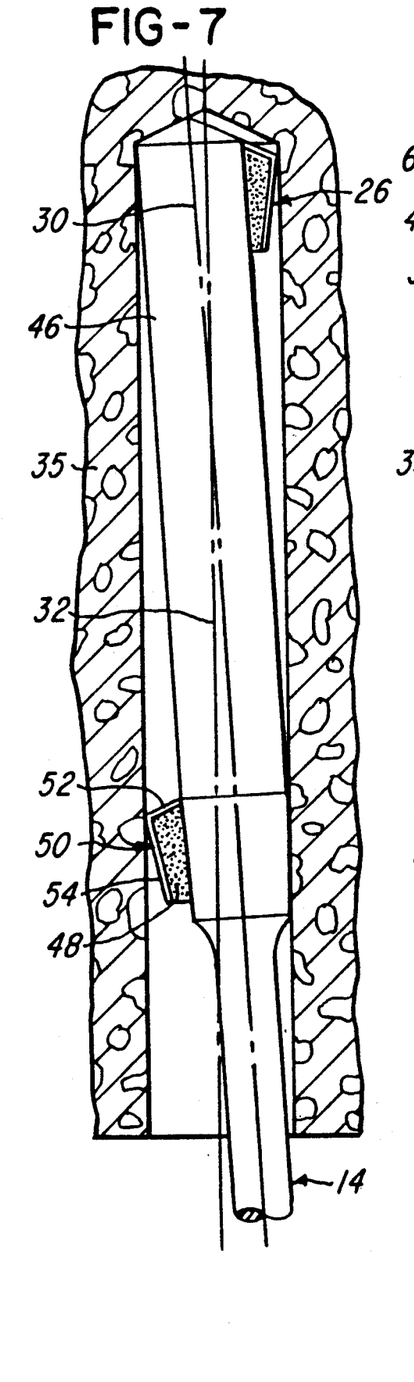
FIG. 7 is a view that shows another exemplary embodiment of an inventive drill bit that has two spaced-apart cutting edges, with this view being taken prior to production of the undercut.
Figure 8:
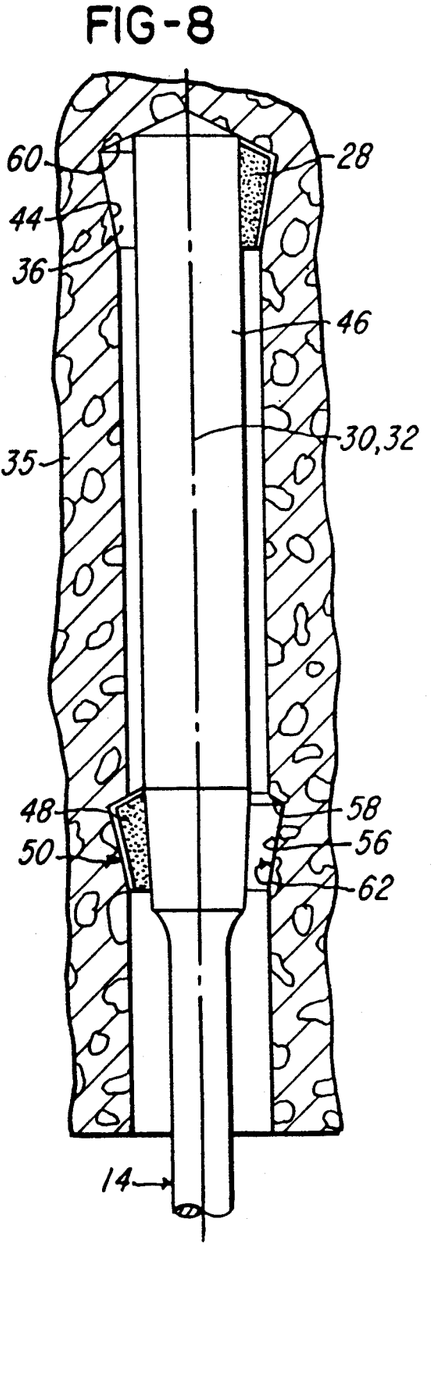
FIG. 8 is a view similar to that of FIG. 7, but after completion of the undercuts.

In the embodiment illustrated in FIG. 7 and in FIG. 8, the front end region 18 is constructed in a manner similar to the embodiment illustrated in FIG. 1. However, in the embodiment of FIG. 7 the diameter of the shaft 16 is not reduced directly behind the front end portion 18, but rather has a cylindrical portion 46 having a diameter that corresponds to the diameter of the front end portion 18.

Provided at the end of the cylindrical portion 46 is a further small hard metal plate 48 that is provided with a further cutting edge 50, which is offset by 180° from the cutting edge 26. The configuration of the hard metal plate 48 corresponds to that of the plate 28, with a front cutting edge portion 52 and a side cutting edge portion 54 being provided.

With this embodiment, at the beginning of a drilling procedure the axis of rotation 30 is not parallel to the axis 32 of the blind hole. Accordingly, the drilling machine that drives the inventive drill bit 14 carries out a harmless, slight wobbling movement if this is not compensated for by an appropriate coupling mechanism.

After the undercuts have been completed, including a further undercut 56 produced by the cutting edge 50, the axis of rotation 30 and the axis 32 of the blind hole again coincide with one another, so that the completion of the bore is also recognizable by the absence of the wobbling movement. The inventive drill bit can now be removed.

When an undercut bore hole is produced with the double undercut drill bit of FIG. 8, a special dowel can be used that permits support at facing or opposite faces of the undercuts 36 and 56. For this purpose it is possible to use either the bearing surface 44 of the undercut 36 and an end face 58 of the undercut 56, or an end face 60 of the undercut 36 together with a bearing surface 62 of the undercut 56. This permits the automatic secure mounting of an appropriate undercut or back taper dowel.

The inventive drill bit can also be used with a an insertion mounting, such as with preset graded concrete, through insulation, or through tiles. "Insertion mounting" refers to a situation where the ceiling or wall is provided with a covering or paneling which, although it does not serve for the actual mounting of the dowel, is provided with an opening so that not only can the undercut hole be produced, but the dowel can be inserted through the opening and then mounted in the hole. During introduction, the embodiment of FIGS. 7 and 8 has to be slightly angled, whereas with the embodiment of FIGS. 1 to 6 the axis of rotation 30 is parallel to the axis of the blind hole in every position. Due to this parallel orientation, a wobbling movement is also avoided at the same time, and the forces that are introduced are delivered for only the desired purpose, namely the production of the undercut 36.

Figures 9, 10:
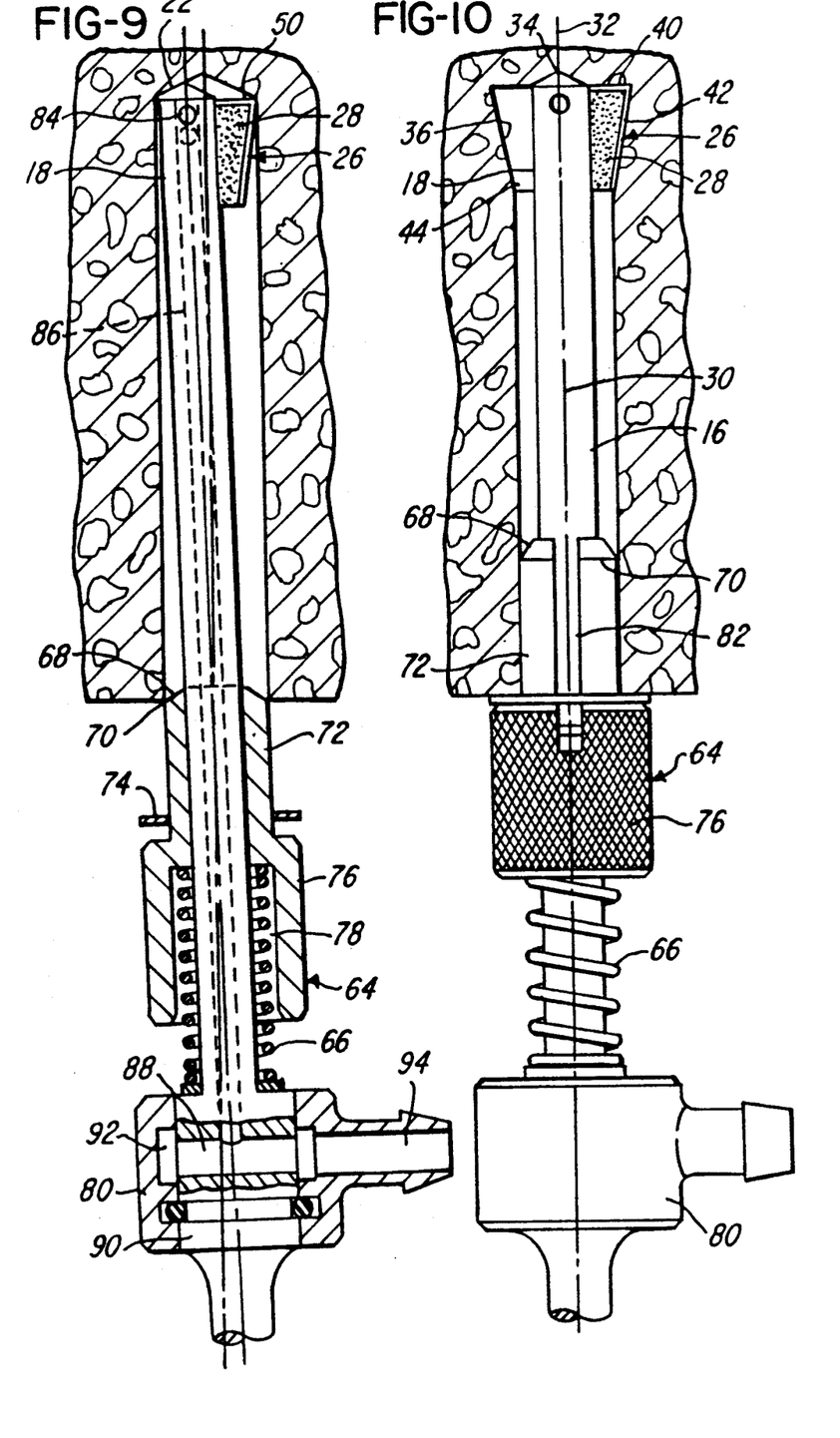
FIG. 9 is a partially cross-sectioned side view of another exemplary embodiment of an inventive drill bit prior to production of the undercut.
FIG. 10 is a side view of the embodiment of FIG. 9 after completion of the undercut.
Figure 11:
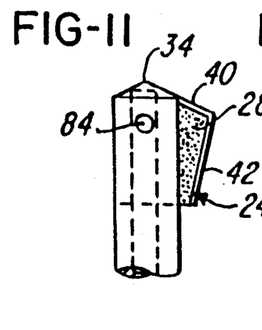
FIG. 11 is a view of the front portion of the embodiment of FIG. 9 but with a modified cutting edge.
Figure 12:
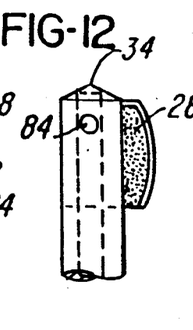
FIG. 12 is a view of the front portion of the embodiment of FIG. 9 utilizing the cutting edge of FIG. 6.
Figure 13:
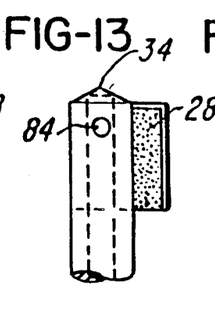
FIG. 13 is a view of the front portion of the embodiment of FIG. 9 utilizing the cutting edge of FIG. 5.
Figure 14:
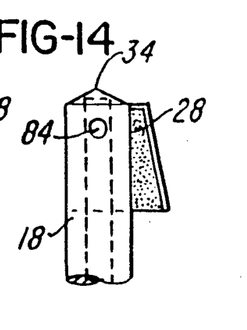
FIG. 14 is a view of the front portion of the embodiment of FIG. 9 utilizing the cutting edge of FIG. 3.

In the embodiment of the inventive drill bit illustrated in FIG. 9 and in FIG. 10, the cutting edge 26 has essentially the same configuration as in the embodiment of FIG. 3. A radially extending front cutting edge portion 50 on the hard metal plate 28 adjoins a side cutting edge portion 42, the angle of inclination of which relative to the drill bit axis 30 can be adapted to requirements, and in the illustrated embodiment is approximately 13°, so that the bearing surface 44 for supporting the back taper dowel has the same pitch relative to the axis 32 of the blind hole.

FIG. 10 illustrates a completed undercut 36, so that the shaft 16 of the inventive drill bit 14 extends coaxial to the axis 32 of the blind hole. The embodiment of the drill bit 14 illustrated in FIG. 9 furthermore differs from the previous embodiments in that an indicator sleeve 64 is guided on the drill bit shaft 16 in such a way that it is movable in a sliding manner; the indicator sleeve 64 is urged toward the tip 34 of the drill bit via a coil spring 66. At that end that faces the tip of the drill bit, the indicator sleeve 64 is provided with an external cone 68 that adjoins, via an edge 70, a sliding cylinder 72. The external cone 68 forms a diameter transition between the diameter of the drill bit shaft 16 and the diameter of the sliding cylinder 72. Attached to the other end of the sliding cylinder 72 is a stamp face 74, the diameter of which is greater than the diameter of the blind hole. The stamp face 74 extends radially, and its surface is provided with a profiling. The stamp face 74 rests upon an indicator sleeve body 76, which similarly has a diameter that is greater than the diameter of the blind hole.

The direction of coil of the spring 66 is opposite to the direction of rotation of the drill bit 14. This assures that the spring cannot untwist. Furthermore, the coil spring 66 is preferably supported at the ends by support disks, which at the same time reduce the frictional resistance.

Pursuant to a modified embodiment, the edge 70 can be rounded off. As a result, and due to the conical angle of the external cone 68, which conical angle conforms to respective requirements, the centering function of the guide surface 22 can be enhanced, and a wobbling movement in the back region of the drill bit 14 can be counteracted. In addition, the outer surface of the indicator sleeve 64 is preferably knurled. This facilitates the manual removal from the blind hole 10 of the sliding cylinder 72, and subsequently the withdrawal of the front end portion 18 of the drill bit 14.

In an alternative embodiment, the stamp face 74 can also be integrally formed on the body 76, although for replacement purposes a separate stamp face 74 is preferred.

As can be seen from FIG. 9, the body 76 is provided on the inside with a recessed area 78 for receiving the coil spring 66. As part of a suction device, a sealing member 80 is provided at that end of the coil spring 66 remote from the tip 34 of the drill bit.

Pursuant to a further exemplary embodiment, it is proposed to provide the completed undercut bore hole with a self-adhesive label. For this purpose, a label, with the adhesive surface toward the outside, is placed upon the sliding cylinder 72, so that it rests against the stamp face 74, which in this embodiment is not provided with a profiling. If the sliding cylinder 72 enters the blind hole 10 the adhesive surface of the label becomes attached to the surrounding wall or cover region of the blind hole 10.

The partially cross-sectioned view of the inventive drill bit 14 illustrated in FIG. 9 shows a position prior to production of the undercut, yet after introduction of the drill bit into the blind hole 10.

In this state, the sliding cylinder 72 is tilted relative to the blind hole 10, so that the edge 70 of the external cone 68 acts as an abutment and, due to the inclination of the sliding cylinder 72 relative to the blind hole 10, prevents the sliding cylinder 72 from sliding into the blind hole 10, even though the outer diameter of the sliding cylinder 72 is equal to or slightly less than the inner diameter of the blind hole. The tilting is effected by the inclination of the axis of the drill bit 14 relative to the axis 32 of the blind hole 10, with this tilting existing as long as an undercut has not yet been completely finished. As can also be seen from FIG. 9, the indicator sleeve 64 has a relatively great mass, so that the stamp face 74 can even produce an impression in relatively hard material.

A further advantageous effect of the indicator sleeve 64 results from the fact that a snapping-in of the indicator sleeve 64 indicates when the undercut has been completed, so that there can be no uncertainty as to how long the drill bit 14 must be used.

As shown in FIG. 10, the external cone 68, the sliding cylinder 72, and the front portion of the body 76 are slotted. One effect of this is that the sliding cylinder 72 can abruptly enter the blind hole 10 as soon as a coaxial orientation is achieved without the air resistance of the pressure produced in the blind hole 10 counteracting the entry of the sliding cylinder 72. In addition, due to the slotted configuration, the operating air for the suction device, which will be described subsequently, can pass into the interior of the blind hole. The side edges of a slot 82 at the external cone 68 should be rounded off slightly in order to prevent a peeling effect at the entrance to the blind hole.

In addition, the width of the slot 82 is somewhat greater than the thickness of the hard metal plate 28 in order to facilitate fitting of the inventive drill bit 14.

The suction device operates with two oppositely disposed suction openings, with one suction opening 84 being illustrated which in the immediate vicinity of the tip 34 of the drill bit extends diagonally toward the front and the outside and is disposed to the side of the small hard metal plate 28. Preferably, two oppositely disposed suction openings 84 are provided that are distributed about the periphery of the tip 34 of the drill bit.

The suction opening 84 is connected to a suction line 86 that, starting from the tip 34 of the drill bit, extends along through the drill bit shaft 16, so that the latter is embodied as a conduit. The suction line 86 ends at the top, i.e. at that end remote from the tip 34 of the drill bit, in a transverse bore 88 that is provided in a connector 90 that is wider than the lower portion of the drill bit shaft 16. The sealing member 80 is disposed on the connector 90. Provided in the sealing member 80 is an annular suction chamber 92 that completely surrounds the transverse bore 88 and communicates with an outlet 94. The outlet 94 is connected to a suction unit, which is known per se, so that the drillings, i.e. the material that is drilled in the region of the undercut 36, is withdrawn via the air stream through the slot 82, along the shaft 16 toward the bottom, through the suction opening 84, the suction line 86, the transverse bore 88, the suction chamber 92, and the outlet 94.

It is advantageous if the sealing member 80 is not completely sealed off relative to the connector 90, so that the air stream can be maintained in all operating states via the entry of secondary air.

FIGS. 11 to 14 illustrate embodiments of drill bit tips 34 having different projections 24, i.e. hard metal plates 28. As can be seen from these figures, the suction opening 84 can always be disposed to the side of the projection 24, whereas with regard to the configuration of the hard metal plate 28, the same structural freedom exists as was the case in connection with FIGS. 3 to 6.

Figures 15, 16, 17, 18, 18A, 19, 19A:
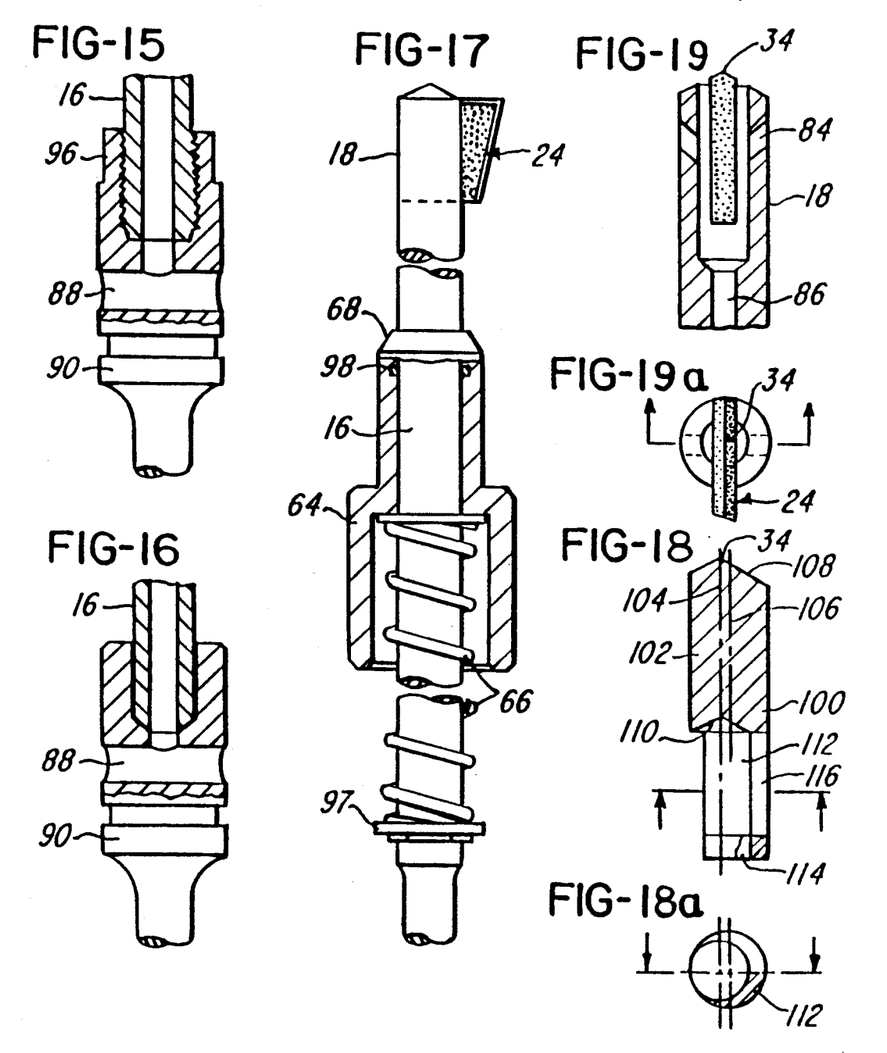
FIG. 15 is a partially cross-sectioned side view of a portion of the embodiment of FIG. 9 showing the connection of the drill bit shaft when a suction device is used.
FIG. 16 is a view that shows a modification of the drill bit shaft connection of FIG. 15, for example via soldering or with a cone connection.
FIG. 17 is a partially cross-sectioned side view of a modification of the embodiment of FIG. 9 utilizing an indicator sleeve but no suction device.
FIG. 18 is a partially cross-sectioned side view of an inventive ancillary extension.
FIG. 19 is a cross-sectional view through an inventive drill bit tip for use with a suction device.
FIG. 19a is a cross-sectional view from above of the drill bit tip of FIG. 19.

FIG. 15 shows the connection of the connector 90 to the drill bit shaft 16. In this embodiment, an internal thread is provided in the connector 90 and a corresponding external thread of the drill bit shaft 16 can be screwed into this internal thread to form a threaded connection 96. With this type of construction, the drill bit shaft 16, together with the appropriate hard metal plate of FIGS. 11 to 14, can be exchangeable, so that the type of undercut, as well as the length of the shaft 16, can be selected at will.

A further type of construction of the connection of the connector 90 to the drill bit shaft 16 is shown in FIG. 16. The shaft 16 can be soldered in the connector 90 or can be press-fit therein, whereby a conical recess could be provided.

It is also possible to use the inventive indicator sleeve 64 with an inventive drill bit 14 without providing a suction device. In this case, the drill bit shaft 16 has a solid construction, i.e. is not embodied as a conduit, and is provided in place of the connector 90 with a stop means 97 for the coil spring 66. This stop means 97 can be embodied as a washer that is disposed in a groove in the drill bit shaft 16, so that the spring 66 can urge the indicator sleeve 64 over the shaft 16 toward the drill bit tip 34. As shown in FIG. 17, sealing rings 98 can be provided on the inner side of the sliding cylinder 72 facing the drill bit shaft 16, and the slot 82 illustrated in FIG. 10 can be eliminated. This embodiment, which is suitable for use where few drillings are produced or to effect cover bores, acts as a sealing means for the blind hole 10 when the external cone 68 is placed against the inlet of the blind hole.

FIG. 18 illustrates an ancillary extension 100 that serves to form one of several inventive undercuts at a distance from the base of the bore hole without having to rely on the embodiment of the drill bit 14 shown in FIGS. 7 and 8. The extension 100 is provided with a cylindrical body 102 the axis 104 of which is eccentric relative to the axis 106 of an external cone 108 at one end of the body 102, and is also eccentric to an axis of an internal cone 110 that is coaxial with the axis 106. The angle of the internal cone 110 and of the external cone 108 correspond to the drill bit tip, with the external cone 108 forming the conical end face 20.

To the side of the internal cone 110, a support arm 112 extends essentially in an axial direction. The support arm 112 carries a retaining arm 114 that essentially extends in a tangential direction. In addition, the support arm 112 is provided with an abutment surface 116, the function of which will be described subsequently.

When the extension 100 is being used, the drill bit tip 34 is inserted into the internal cone 110 from the open side, and the extension 100 is rotated relative to the drill bit tip 34 counter to the direction of rotation of the drill bit to such an extent that the retaining arm 114 extends about the drill bit shaft 16 below the small hard metal plate 28, i.e. the projection 24, and thus provides a support for the extension 100 in an axial direction on the drill bit 14; at the same time, the abutment surface 116 comes to rest against the hard metal plate 28 at the side. This abutment also prevents a tangential twisting, so that upon activation of the drill bit, the extension 100 is taken along in the direction of rotation, as can be seen from FIG. 21.

As shown in the partially cross-sectioned view of the extension 100 in FIG. 18a, the retaining arm 114 extends about the drill bit 14 only to such an extent that a lateral insertion is readily possible.

At the same time, the fact that the retaining arm 114 engages the projection 24 from behind effects an axial arresting of the extension 100, so that the extension can be reliably withdrawn from the blind hole 10.

FIG. 19 illustrates the position and alignment of the suction openings 84 relative to the drill bit tip 34. In this alternative embodiment, the suction line 86 terminates in the vicinity of the drill bit tip 34 in a widened portion that permits the hard metal plate to be soldered over the entire thickness of the wall in a slot provided in the drill bit tip 34, so that replacement is relatively easy, and at the same time the guide surface 22 is protected against wear over its entire length.

Figure 20:
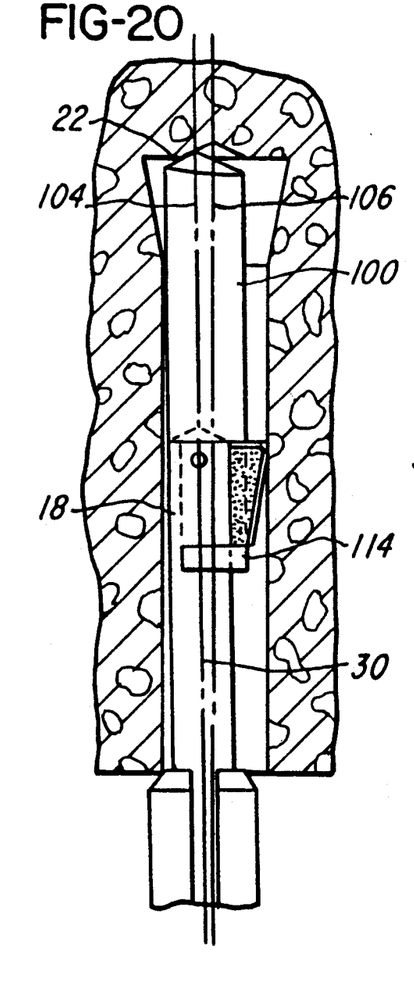
FIG. 20 is a side view of an exemplary embodiment of the inventive drill bit similar to that shown in FIGS. 9 and 10 together with the use of an inventive extension, with this view being taken after completion of the first undercut but prior to the production of the second undercut.
Figure 21:
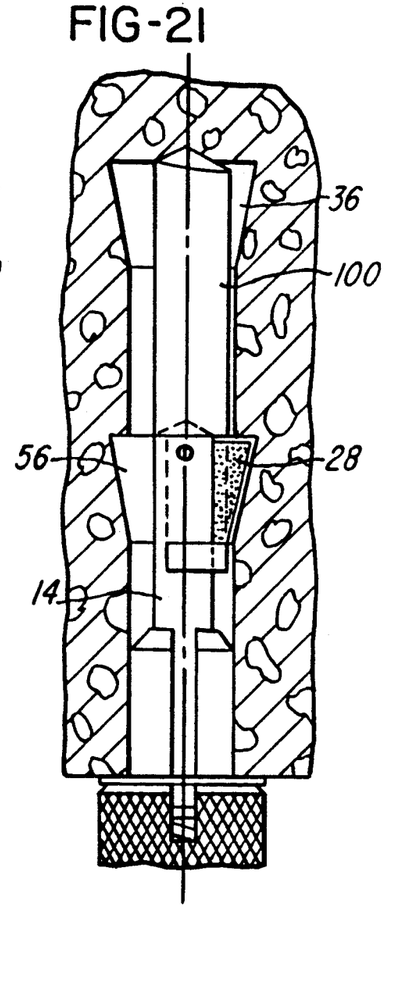
FIG. 21 is a view similar to that of FIG. 20 but after completion of the second undercut

FIGS. 20 and 21 illustrate the operation of an inventive drill bit 14 utilizing an ancillary extension 100, with FIG. 21 showing the end state, i.e. after completion of the second undercut 56, and FIG. 20 showing the state of the blind hole 10 prior to completion of the second undercut yet after completion of the first undercut 36.

FIG. 20 also illustrates the asymmetrical position of the axis 104 of the body 102 relative to the axis 32 of the blind hole 10, whereas in the state illustrated in FIG. 21 the axis 32 of the blind hole 10 and the axis 104 of the body 102, as well as the axis of rotation 30 of the drill bit 14, coincide with one another while the axis 106 of the external cone 108 is now eccentric to these axes.

The present invention is, of course, in no way restricted to the specific disclosure of the specification and drawings, but also encompasses any modifications within the scope of the appended claims.

What we claim is:

1. In a drill bit for producing at least one undercut, with said drill bit including a shaft and a cutting edge that is disposed asymmetrically radially beyond said drill bit in a front end portion of said drill bit, said drill bit having an axis of rotation coaxial with an axis of said shaft, the improvement wherein:

said drill bit has a conical end face that is disposed on said front end portion remote from said drill bit shaft, with a planar guide surface being provided on said conical end face, with said guide surface being disposed radially opposite from said cutting edge, and with said drill bit having a tip concentric to said drill bit axis at which said guide surface terminates, said drill bit being provided for use in a previously produced blind hole having a conically shaped base; and in said guide surface extending in an essentially radial direction form an outer periphery of said front end portion of said drill bit to said tip thereof at an angle to an axis of rotation of said drill bit, with said angle conforming to the cone angle of said base of said blind hole, and said drill bit shaft being provided with a spring-loaded indicator sleeve that is adapted to snap into said blind hole as soon as said drill bit is centered in said blind hole.

2. A drill bit according to claim 1, in which said indicator sleeve is provided with a marking or adhesive ring having a surface, remote from said indicator sleeve, that is provided with adhesive.

3. A drill bit according to claim 1, in which said indicator sleeve has a front end, facing said front end portion of said drill bit, that is formed by a sliding cylinder having an edge and an external cone with a cone angle of approximately 20° to 50°.

4. A drill bit according to claim 3, in which said indicator sleeve is provided with a stamp face which, upon release of said sliding cylinder edge at said blind hole, is adapted to form an impression upon a wall region that surrounds said blind hole.

5. In a drill bit for producing at least one undercut, with said drill bit including a shaft and a cutting edge that is disposed asymmetrically radially beyond said drill bit in a front end portion of said drill bit, said drill bit having an axis of rotation coaxial with an axis of said shaft, the improvement wherein:

said drill bit has a conical end face that is disposed on said front end portion remote from said drill bit shaft, with a planar guide surface being provided on said conical end face, with said guide surface being disposed radially opposite from said cutting edge, and with said drill bit having a tip concentric to said drill bit axis at which said guide surface terminates, said drill bit being provided for use in a previously produced blind hole having a conically shaped base; and in said guide surface extending in an essentially radial direction from an outer periphery of said front end portion of said drill bit to said tip thereof at an angle to an axis of rotation of said drill bit, with said angle conforming to the cone angle of said base of said blind hole, and an extension that has a first end with ann external cone, and an oppositely disposed second end that is detachably secured to said drill bit and has an internal cone that conforms to said drill bit tip.

6. A drill bit according to claim 5, in which said extension is interchangeable, so that several undercuts can be produced in a single blind hole using extensions of different lengths.

7. A drill bit according to claim 5, in which said internal cone, said external cone, and said drill bit axes are coaxial with one another prior to production of said undercut, whereas said extension has a body with an axis that in this state is eccentric to said first-mentioned axes.

8. A drill bit according to claim 7, in which said cutting edge is provided on a projection of said drill bit; in which said extension is provided with an abutment surface that is adapted to the profile of said projection and serves for support of said extension against said drill bit tip in such a way that said extension can rotate in only one direction; and in which said extension is provided with a retaining arm that extends about said projection.

9. A drill bit according to claim 8, in which said extension includes a support arm that carries said retaining arm and is provided with said abutment surface; and in which said retaining arm and said support arm together extend about approximately 300° of said drill bit shaft, namely at most to such an extent that said drill bit projection can be passed through the resulting gap that remains.

* * * * *